E. T. BATES.
TILING.
APPLICATION FILED MAY 20, 1909.
947,290.
Patented Jan. 25, 1910.
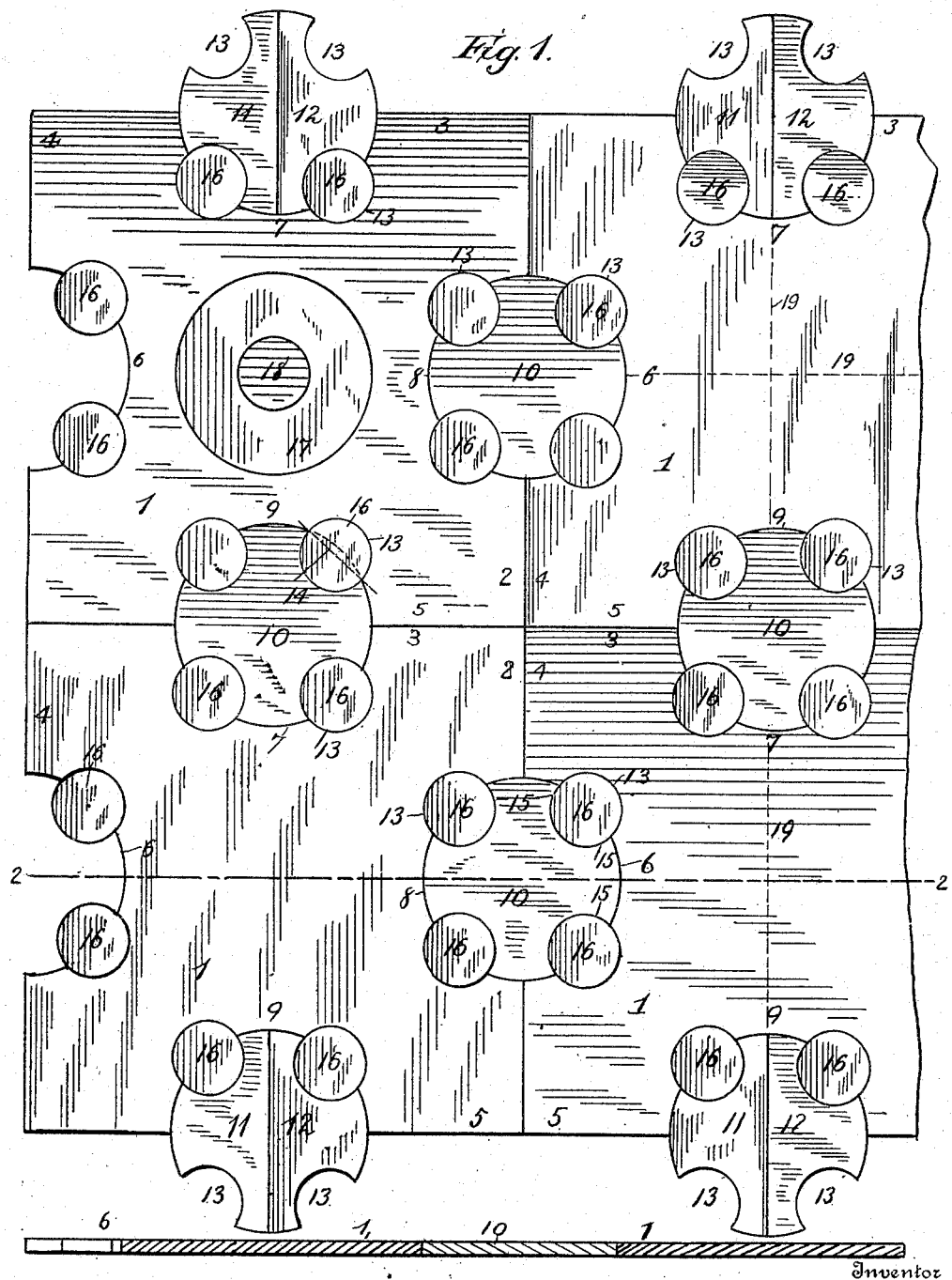

UNITED STATES PATENT OFFICE.

EDWARD T. BATES, OF WASHINGTON, DISTRICT OF COLUMBIA.

TILING.

947,290.  Specification of Letters Patent.  Patented Jan. 25, 1910.

Application filed May 20, 1909. Serial No. 497,202.

*To all whom it may concern:*

Be it known that I, EDWARD T. BATES, a citizen of the United States, residing at Washington, in the District of Columbia, have invented certain new and useful Improvements in Tiling; and I do hereby declare the following to be a full, clear, and exact description of the invention, such as will enable others skilled in the art to which it appertains to make and use the same.

My invention relates to decorative art, such as floor and mural decorations, combining therewith utility, durability and economy, has for its object the production of tiling which can be made highly ornamental by separating the tiles into parts and using a variety of colors to produce pleasing designs.

The invention consists in certain improvements in construction, whereby parts removed from one tile of one color are interchangeable with like parts removed from tiles of other colors, and all the material from which the tiles are made utilized without loss by waste or scrap ends.

Tile molded of clay, rubber, rubber compounds and the like are expensive and thereby greatly limited in their use. It is my purpose to produce a more economical article of the kind, without sacrificing any of the decorative, sanitary or other desirable qualities of such tiling, by using linoleum, rubber, or other suitable material and cutting the tiling from sheets of the desired material.

The invention will be fully disclosed in the following specification and claims.

In the accompanying drawings, which form part of this specification:—Figure 1 represents a plan view, showing a plurality of tiles secured together, and Fig. 2 represents a transverse section of the same on line 2, 2, Fig. 1.

Reference being had to the drawings and the designating characters thereon, the numeral 1 indicates the tiles having abutting sides or edges, in the present instance four, indicated by the numerals 2, 3, 4, 5, but the configuration of the tiles may be varied to suit taste, and conditions of use, and may thus be of any other preferred form, so long as they are provided with parallel abutting sides or edges.

In the sides or edges of the tiles are formed semi-circular openings 6, 7, 8, 9, which, when made to register with like semi-circular openings in an adjoining tile form circular openings, which are filled by circular members 10, or by two semi-circular members 11, 12.

13 indicates circular openings formed partly in the tiles 1 and partly in the members 10, or 11, 12, the centers of which openings are preferably on a line drawn between the intersections of the circle describing said openings, and the circle describing the openings 6, 7, 8, 9 and preferably inside of the latter circle, as shown or indicated at 14, which form overhanging members or parts 15, on opposite sides of the openings 13, which in connection with the keys 16 inserted in said opening 13, serve to lock adjoining tiles together and retain the members 10 in position. It is found desirable in the construction of some tiling to further remove portions of the tiling by cutting out one or more circular members 17, and 18, preferably of the diameter of the members 10 and 15 respectively, the latter being removable from the center of the former, and serve a two-fold purpose, first, they admit of further or additional ornamentation, and also prevent buckling of the tiles, by more evenly distributing the severing of the fiber, and also aiding in distributing the pressure on the tiles.

The tiles may be made of a variety of material and colors and placed in position to produce ornamental designs in great variety, or a surface combining hard or rigid materials with others more elastic, to utilize the durability of the former while securing the resilience and anti-slipping qualities of the latter. The circular members 10 and the keys 16 cut out of tile of any preferred color, may be distributed throughout other tiles of different colors to produce further artistic and ornamental effects.

There is practically no limit to the changes in designs that may be produced by the different colors of the tiles and the artistic distribution of the members 10, 11, 12 and the keys 16.

The tiling is preferably made of linoleum, rubber or other material in sheets that can be readily cut into squares and circles with sharp edged tools or knives. The circular members and keys may be cut out by punches, and the tiles may be severed from the sheet by a suitable knife, or a suitable machine-operated stamp or die may be used.

It will be observed that by separating the tiling into parts as described, no part of the material is lost or wasted, and the part cut out of one tile will fit into a like opening in any other tile or like construction, there being no waste by the cutting and no ragged edges formed to resist insertion of members or keys by friction. Furthermore, the distribution of the openings, and their filling members is such, that no buckling of the tiling occurs, and repairs are easily and readily made, by displacing or removing injured or worn tiles and substituting new tiles.

The tiles may be separated into quarters as indicated in dotted lines at 19, or other divisions thereof may be made as desired to change the design being worked out, or the conditions required.

It is obvious that changes may be made in form of the tiles, the members 10, 11, 12 and the keys 16 without departing from the spirit of my invention; or the tiles, of suitable material for the purpose, may be made into an interesting and instructive toy by the almost unlimited combinations of colors and designs that can be constructed from two or more tiles of different colors.

Having thus fully described my invention, what I claim is—

1. Tiling having abutting sides provided with openings, members filling registering openings of adjoining tiles, and keys for connecting said members to the tiles.

2. Tiling having abutting sides provided with semi-circular openings, circular members filling registering openings of adjoining tiles, and keys for connecting said members to the tiles.

3. Tiling having abutting sides provided with semi-circular openings, circular members filling registering openings of adjoining tiles and circular keys connecting said members to the tiles.

4. Tiling having abutting sides provided with semi-circular openings, circular members filling said openings, the tiles and the circular members being provided with circular openings formed partly in the tile and partly in said members, and circular keys engaging the latter openings.

In testimony whereof I affix my signature, in presence of two witnesses.

EDWARD T. BATES.

Witnesses:
D. C. REINOHL,
PHILIP F. LARNER.